Oct. 25, 1927.

W. E. GOSSLING

CLAMP TERMINAL

Filed July 30, 1920

1,646,909

Inventor:
Walter E. Gossling,
By Byrnes Townsend & Brickenstein,
Attorneys.

Patented Oct. 25, 1927.

1,646,909

UNITED STATES PATENT OFFICE.

WALTER E. GOSSLING, OF NEW YORK, N. Y., ASSIGNOR, BY MESNE ASSIGNMENTS, TO PREST-O-LITE STORAGE BATTERY CORPORATION, A CORPORATION OF INDIANA.

CLAMP TERMINAL.

Application filed July 30, 1920. Serial No. 400,010.

This invention relates to clamp terminals for coupling cables or other current conductors to the terminal posts of storage batteries.

In order to repair or recharge a storage battery, or for other reasons, it is often necessary to disconnect the battery from the conductor through which current is transmitted therefrom or thereto. The primary object of this invention is therefore to provide a simple and inexpensive coupling device with which it shall be possible, by a minimum of manipulation, to connect and disconnect a cable or conductor and the terminal post of a battery.

The above and other objects, and the novel features of the invention, will be apparent from the following description taken in connection with the accompanying drawing, in which Fig. 1 is a perspective view illustrating a portion of a storage battery and a clamp terminal embodying this invention applied to the terminal post of the battery;

Figure 1:
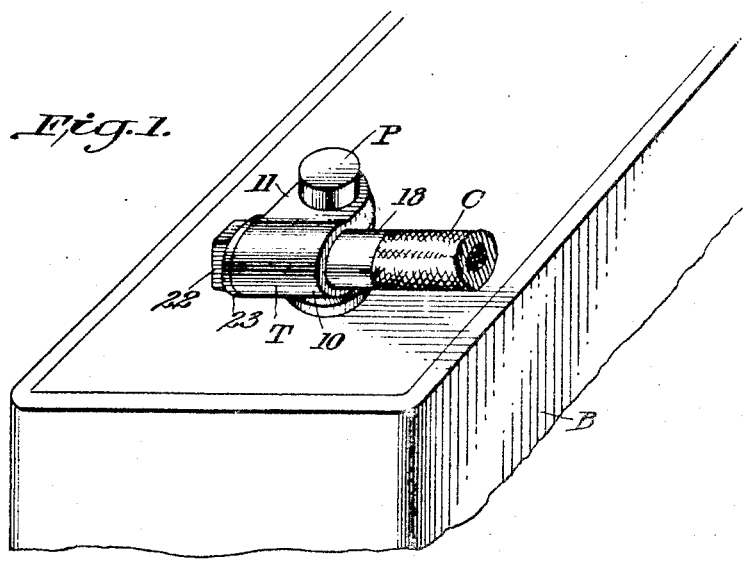
Figure 2:
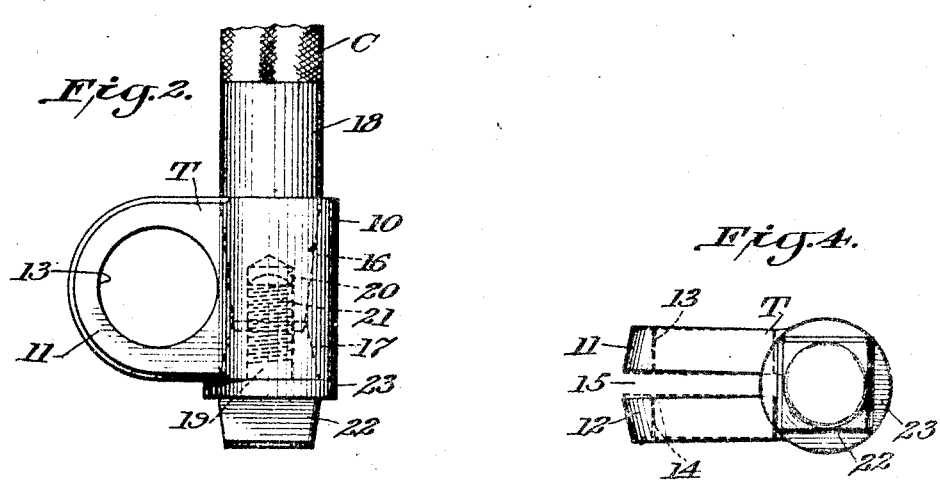
Fig. 2 is a plan view of a clamp terminal embodying this invention, showing a cable secured thereto.

Referring to the drawing, B represents a storage or other type of battery having an upwardly projecting terminal post P to which a cable or other suitable conductor C may be connected by a clamp terminal T to conduct current to or from the battery. While the clamp terminal embodying this invention is shown and described as particularly applicable to the purpose of electrically and mechanically connecting a conductor to the terminal post of a storage battery, it will be understood that the principles of this invention may be advantageously employed in other instances where a readily attachable and detachable coupling means is desired.

The clamp terminal T comprises a slotted barrel portion 10 and two spaced similar wings or laterally extending members 11 and 12, the barrel portion being arranged to receive the conductor and said members being arranged to be secured to the terminal post to which the conductor is to be connected. The members 11 and 12 are most desirably formed integral and in one piece with the barrel portion 10, the whole being cast or otherwise formed of suitable metal that will resist corrosion, such as antimony-lead or other alloy.

The clamp terminal may be secured to the post P, through the laterally-extending members, in various ways and I have herein disclosed an efficient connecting means in which the wings or members 11 and 12 are respectively provided with openings 13 and 14 which are normally in axial alinement so that they will freely slip over but snugly fit the terminal post P of the battery. While the post P and the holes 13 and 14 are circular, other types of posts and holes may of course be employed without sacrificing the advantages of the invention, it being only desirable that the shape of the holes shall substantially conform to that of the post. The laterally-extending members 11 and 12 are normally substantially parallel, being normally separated by a relatively narrow space 15 which opens into or communicates with the interior of the barrel portion 10 through the longitudinal split or slot in the latter, thus providing two wings or members which are not directly connected to one another, so that they may be adjusted relatively to one another to throw the openings 13 and 14 out of alinement and thereby cause the members 11 and 12 to exert a gripping action on the post to securely connect or clamp the clamp terminal to the post.

Various satisfactory methods may be employed to spread the members apart to cause the edges of the openings 13 and 14 to bind or bite into the terminal post P and thereby firmly grip the latter and provide a suitable electrical connection between the terminal post and the clamp terminal and one that may be readily broken for disconnecting the battery. In the arrangement disclosed, the barrel member 10 has two tapering sockets 16 and 17, the smaller ends of which merge into one another. These sockets are arranged to receive the tapering end of a lug 18 united to the conductor C, the particular socket into which said lug is inserted depending upon the size of the lug.

Figure 4:
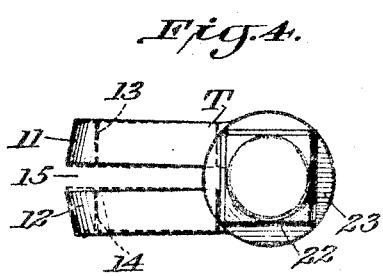
Figs. 3 and 4 are end views of the clamp terminal, respectively showing the laterally extending members thereof in normal position and in the position they occupy when the device has been applied to a storage battery terminal post.
Figure 3:
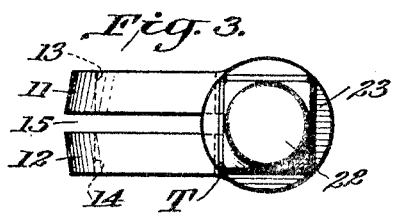
Figure 5:
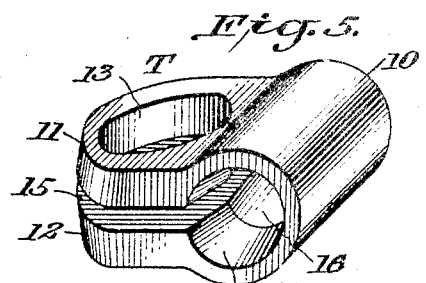
Fig. 5 is a perspective view of the one-piece conductor-receiving and terminal post engaging device embodying this invention.

A securing pin 19 is so arranged that it may force the lug 18 into either of these respective sockets to provide a suitable and yet a quick detachable connection between the conductor C and the clamp terminal T. The wedging pressure exerted by the pin 19 through the lug 18 as the latter is forced into its socket causes the laterally-extending members 11 and 12 to be spread apart, as illustrated in Fig. 4, in which the dotted lines indicate the original positions of these members. Accordingly, the holes 13 and 14 are thrown out of alinement and the members 11 and 12 grip the terminal post to which they have been applied. In the present arrangement a screw-threaded connection is provided between the lug 18 and the pin 19 so that by turning the pin the lug 18 will be drawn tightly into its socket in the hollow or barrel portion 10. As illustrated, the screw-threaded connection comprises a threaded socket 20 in the free end of the lug 18 that is adapted to receive a threaded part 21 at the inner end of the pin 19. The outer end of the pin is desirably provided with an angular head 22 whereby the pin may be turned with a wrench or similar tool. The pin 19 may also be provided with a collar 23 that is adapted to engage one end of the barrel, providing an abutment which limits the inward movement of the lug.

It will be seen that a considerable force may be exerted by the binding means or pin 19 to draw the conductor into place in the barrel and to spread the members 11 and 12 so that they will firmly grip the post P, and at the same time the coupling is very quickly and readily detachable to disconnect the battery or the conductor or both.

While I have herein disclosed a desirable embodiment of my invention, it is to be understood that I do not wish to be limited to the details shown and described, since the invention may take other forms without sacrificing the advantages of the principles disclosed.

I claim:

1. A clamp terminal for coupling a conductor to a terminal post comprising, in combination, a hollow or barrel portion adapted and arranged to receive a portion of a conductor, a pair of separated members connected to and extending laterally from said barrel portion and adapted to fit freely about a terminal post, and means comprising a tapering adjustable member projecting into said barrel portion and cooperating with such laterally-extending members on the barrel portion to firmly secure said clamp terminal to the terminal post to which it has been applied.

2. A clamp terminal for coupling a conductor to a terminal post comprising, in combination, a hollow or barrel portion adapted and arranged to receive a portion of a conductor, a pair of terminal post gripping members extending laterally from said barrel portion, such members being spaced apart at their outer extremities and where apart at their outer extremities and where they are connected to said barrel portion, and means for securing a conductor in said barrel portion and for securing said laterally-extending members to a terminal post comprising binding means projecting into said barrel portion and cooperating with such laterally-extending means.

3. A clamp terminal for coupling a conductor to a terminal post comprising, in combination, means adapted and arranged to receive a portion of a conductor, laterally-extending members integral with such conductor-receiving means and apertured to fit a terminal post, and means for securing a portion of a conductor to said conductor-receiving means and cooperating with said laterally-extending members to separate them and to thereby cause them to grip the exterior of a terminal post to which the terminal has been applied.

4. A clamp terminal for coupling a conductor to a terminal post comprising, in combination, a barrel portion having a socket adapted to receive a part of a conductor, laterally-extending members on said barrel portion adapted to fit a terminal post, and means projecting into said barrel portion for securing a part of a conductor in said socket and cooperating with said laterally-extending members to separate them and cause the same to grip a terminal post to which the terminal may be applied.

5. A clamp terminal for coupling a conductor to a terminal post comprising, in combination, a split barrel portion having a tapering socket adapted to receive the end of a conductor, laterally-extending portions carried by said barrel portion and normally adapted to freely fit about a terminal post, and means for engaging the end of a conductor to secure it in said tapering socket and cooperating with said split barrel portion and said laterally-extending portions to cause the latter to tightly fit or clamp the terminal post to which they are applied.

6. A clamp terminal for coupling a conductor to a terminal post comprising, in combination, a longitudinally split barrel adapted to receive part of a conductor, post engaging means extending laterally from said barrel adjacent the split thereof, and binding means adapted to secure a conductor in said barrel and operative to cause such post engaging means to grip a post.

7. A clamp terminal for coupling a conductor to a storage battery terminal post comprising the combination with a unitary device having means adapted and arranged to receive a part of a conductor, and spaced laterally-extending members integral with such conductor-receiving means and having holes normally adapted to freely fit the outer end of a storage battery terminal post, of means for engaging a part of a conductor to secure it to such conductor-receiving means, such securing means being arranged to cooperate with said spaced members to adjust them relatively to one another so the edges of said holes will firmly grip the outer end of a storage battery terminal post to which the device is applied.

8. A clamp terminal for coupling a conductor to a terminal post comprising, in combination, a barrel adapted to receive part of a conductor into one end thereof and having a slot extending partially through its wall, post engaging members extending laterally from said barrel adjacent said slot, and binding means projecting into the other end of said barrel for securing a conductor in the opposite end of said barrel and cooperating with such barrel and members to cause the latter to grip a post to which such clamp terminal is applied.

9. A clamp terminal for coupling a conductor to a storage battery terminal post comprising the combination of a one-piece device having a split barrel portion adapted and arranged to receive a part of a conductor and also having spaced, normally parallel, laterally-extending members integral with said barrel portion and provided with alined openings normally adapted to freely fit the outer end of a storage battery terminal post, and binding means projecting into said barrel portion and arranged to secure a part of a conductor therein, such binding means being also arranged to cooperate with said laterally-extending members to spread them apart to throw such openings out of alinement and thereby cause such members to firmly grip the terminal post to which the device has been applied.

10. A clamp terminal for coupling a conductor to a terminal post comprising, in combination, a barrel having a tapering socket adapted to receive a part of a conductor and also having a longitudinal slot extending through its wall, post engaging members extending laterally from said barrel adjacent said slot, and binding means for drawing a conductor into said tapering socket so as to cooperate with said barrel and said members to cause the latter to grip a terminal post to which such clamp terminal is applied.

11. A clamp terminal for coupling a conductor to a storage battery terminal post comprising the combination of a barrel adapted and arranged to receive a part of a conductor into one end thereof, spaced normally parallel laterally extending members integral with said barrel and provided with openings normally adapted to freely fit the outer end of a storage battery terminal post, and binding means extending into said barrel and adapted to secure a part of a conductor in said barrel, the space between such laterally extending members communicating with the interior of said barrel, whereby said binding means causes said members to grip a terminal post as a conductor is secured in said barrel.

12. A clamp terminal of the class described having, in combination, means adapted to receive a conductor or the like, members recessed to receive a terminal post or the like, and means for securing a conductor to such conductor-receiving means and cooperating with said members to spread them apart to cause them to firmly grip the exterior of a terminal post to which they are fitted.

In testimony whereof, I affix my signature.

WALTER E. GOSSLING.